(12) United States Patent
Weiner

(10) Patent No.: US 6,912,544 B1
(45) Date of Patent: Jun. 28, 2005

(54) SYSTEM AND METHOD FOR INTERLEAVING OF MATERIAL FROM DATABASE AND CUSTOMIZED AUDIO-VISUAL MATERIAL

(75) Inventor: Moshe Weiner, Kiron (IL)

(73) Assignee: Comverse Ltd., Tel Aviv (IL)

( * ) Notice: Subject to any disclaimer, the term of this patent is extended or adjusted under 35 U.S.C. 154(b) by 702 days.

(21) Appl. No.: 09/652,002

(22) Filed: Aug. 31, 2000

(51) Int. Cl.[7] .............................................. G06F 17/30
(52) U.S. Cl. ........................ 707/104.1; 707/102; 707/10
(58) Field of Search .............................. 707/102, 104.1, 707/10, 1, 3, 4; 709/201–203

(56) References Cited

U.S. PATENT DOCUMENTS

| | | | | |
|---|---|---|---|---|
| 5,812,134 A | * | 9/1998 | Pooser et al. ................ | 345/848 |
| 6,301,586 | * | 10/2001 | Yang et al. ................ | 707/104.1 |
| 6,366,914 | * | 4/2002 | Stern .......................... | 707/10 |
| 6,370,543 | * | 4/2002 | Hoffert et al. ........... | 707/104.1 |
| 6,393,431 | * | 5/2002 | Salvati et al. ............ | 707/104.1 |

* cited by examiner

*Primary Examiner*—Greta Robinson
*Assistant Examiner*—Debbie M. Le
(74) *Attorney, Agent, or Firm*—Sughrue Mion, PLLC

(57) ABSTRACT

A system and method for real-time transfer of multimedia material from a remote device to a centralized multi-media storage unit, wherein the multimedia material is combined with extrinsic material to generate a virtual record. A user selects specifications and instructions via a remote terminal for retrieving the extrinsic material from external databases and interleaving the retrieved extrinsic material to the multimedia material provided by the user. Iteration of the selecting of user specifications and instructions and the interleaving process is performed until a final virtual record is produced which is satisfactory to the user.

21 Claims, 4 Drawing Sheets

FIG. 3: CONTENT ENRICHMENT INTERFACE
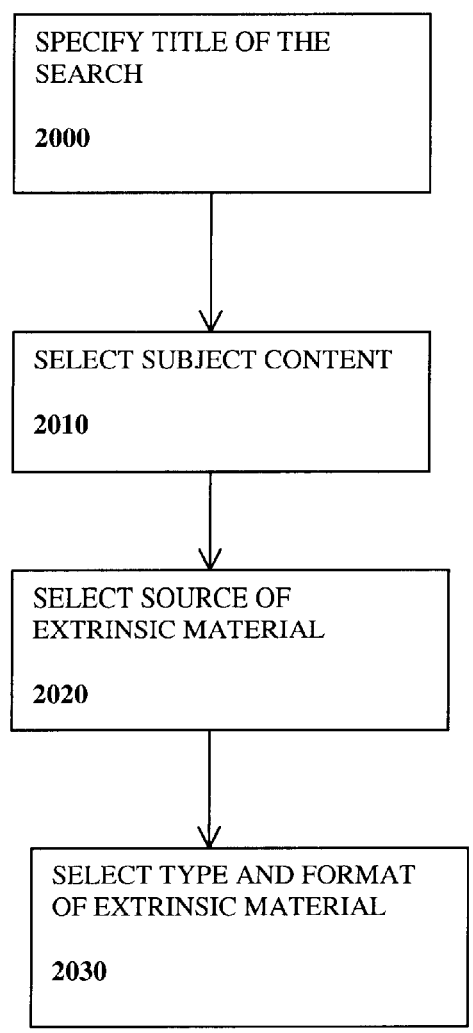

SYSTEM AND METHOD FOR INTERLEAVING OF MATERIAL FROM DATABASE AND CUSTOMIZED AUDIO-VISUAL MATERIAL

FIELD OF INVENTION

The present invention relates to a system and method for multi-media generation and storage. More particularly, the present invention relates to a system and method for user customization of audio-visual material through the addition of extrinsic material from pre-existing databases, wherein the audio-visual material and extrinsic material are interleaved in accordance with user instructions, and the interleaved material is stored in a multi-media application server.

BACKGROUND OF THE INVENTION

Conventional film photography is being replaced by digital photography, wherein different types of audio-visual (A-V) material or data (i.e., audio, film, and pictures), are generated in a digital format. The digital A-V data may be stored in a computer system and/or transmitted to remote locations via communication lines. The digital A-V material generally requires very large quantities of electronic memory. If a memory unit is incorporated into a remote device, such as a handheld video camera, then the memory unit will be costly and bulky. However, due to limitations of the current generation of cellular technology, the so-called "2G" generation operating at speeds up to 9.6 kbps, the A-V material cannot realistically be wirelessly transferred in real-time to a remote storage device. Further, the digital material stored within the remote storage device cannot be incorporated with material external to the remote storage device, but rather must be first downloaded to a separate storage area. Presently, there are no procedures for automatically interleaving customized material produced by a remote user and material in previously prepared databases of various types of audio-video material.

A number of different approaches have been proposed to solve the above-described problems but they do not solve all of the problems and do not provide an integrated system. For example, U.S. Pat. No. 4,888,648, to Tekeucchi et al., describes a means for storing image information. U.S. Pat. No. 5,418,6554, to Scheffler, provides a method for creating a customized album, according to the actions of a human operator. U.S. Pat. No. 5,796,428, to Matsumoto et al., provides a system for classifying image data that has been stored. U.S. Pat. No. 5,937,405, to Campbell, describes a method for updating a previously stored blocks of data. Further, a variety of conventional commercial networks offer the possibility of off-line storage in return for payment. Some of these would be described at www.ememories.com, www.bigvault.com, www.mushpot.com, www.webphotos.com, //kodak58.photonet.com, www.sandisk.com, www.punchnetworks.com, and //angelfire.lycos.com. Another Web site of interest is www.mslide.com, which provides users with a music library and a means to build a slideshow.

Third generation (3G) cellular communication specifications include a proposal for the addition of a Multimedia Messaging Service (MMS) which will allow users to send and receive messages using multiple types of media such as text, images, audio and video. The standardization organization for 3G cellular (3GPP) will not standardize new services, but rather will use a standardized set of service enabling features upon which new services will be provided. Technical specifications nos. TS22.140 and TS23.140 of 3GPP describe the multimedia messaging services. In addition, the standards organization 3GPP2, which is the U.S. equivalent of 3GPP, is preparing competing standards for 3G cellular based on the U.S. 3G standard called cdma2000 and is expected to create its own standards for MMS.

None of the above-described systems and methods provide for automatic or real-time downloading to a remote storage device. Nor do the conventional systems and methods provide for interleaving of user supplied material and material selected according to some criteria provided by the user or editing of the interleaved data and iteration of the interleaving process.

SUMMARY OF THE INVENTION

In view of the above-described deficiencies of the conventional systems and methods, it is an object of the present invention to provide an integrated system and method for real-time downloading of multimedia material from a remote device to a centralized multi-media storage unit, selecting user specifications and instructions for retrieving extrinsic material from external databases and adding the retrieved extrinsic material, interleaving the extrinsic material with the multimedia material provided by the user, and iteration of the selecting of user specifications and instructions and interleaving process until an final product is produced which is satisfactory to the user.

It is therefore one object of the present invention to provide for real-time downloading of multimedia material from a remote device to a central storage unit. In this sense, "real-time" means that the material is streamed from the remote device to the central storage unit as the material is created. Clearly, the invention will also operate correctly with material that is added to the central storage unit not in real-time but rather some time after creation of the material. The central storage unit shall be called "a multi-media storage unit", or "MMSU". The multimedia material supplied by the user shall be called "the user record". Material that is added to the user record from outside databases shall be called "extrinsic material".

It is another object of the present invention to provide a method and a process by which the user may set criteria for the selection of extrinsic material, and may also set criteria for the interleaving of the extrinsic material with the material in the user record. The interleaved product, which is the product that includes both the user record and the extrinsic material, shall be called the "virtual record".

It is yet another object of the present invention to provide a method by which the material in the user record may be updated in the MMSU with extrinsic material, such method being executed by the MMSU itself together with the computer network to which the MMSU is connected.

It is a further object of the present invention to provide a method and a process by which the user will receive a draft of the virtual record, and execute an iterative process to refine the draft into the final product. The iterative process will include the user's addition of new material, subtraction of unwanted material, editing of old material, and provision of additional criteria by which the invention will select and interleave additional extrinsic material. The iterative process will continue until the user is satisfied with the final product.

The present invention comprises a data recorder operated by a user to generate a user record comprising pictures, film, or audio of an event, or a combination thereof. The data recorder for creation of such material may be a digital camera (either for fixed photographs or for moving pictures), but any device for recording multi-media is within the purview of the invention. The user record is transmitted to the MMS using standards of the new generation of cellular architecture, known as third generation (or "3G") cellular, will permit data speeds from wireless devices up to at least 2 Mbps. Other standards, such as the in-building standards Bluetooth or IEEE802.11, will permit wireless transmission at speeds of 10 Mbps and beyond. The invention will operate with all of these standards, including, for example, all versions of the 3G standard, such as Wideband CDMA and CDMA 2000. The standards, and the cellular system on which the standards are based, constitute the platform, the implementation, and operation of the invention. Using such standards, the material in the user record can be transmitted in real-time ("streamed") as it is being created to the MMSU.

In many cases, the user cannot capture in the user record all of the material desired for the virtual record. For example, the user may wish to add top songs of the region visited, or photographs of famous tourist sites in the place of visit (which the user may not have had time to see). The user will add the criteria by which extrinsic material will be selected. The processor that is part of the MMSU system will select the material according to such criteria, shall interleave the extrinsic material with the user record, and shall send the interleaved result to the MMSU, for later review by the user.

The MMSU system will notify the user when a draft of the virtual record is complete. The user will then download that draft, such downloading to be done from the MMSU to a computer terminal or to a telephone, which may be a wireline or a wireless telephone. If audio is included in the virtual record, then the computer terminal must have an audio player and a sound card, both of which are well known in the art. If video is included in the virtual record, the telephone must include a viewer space, such as a video screen. This is a structure and a feature well known in the art. Any combination of computer and telephone, such as a PDA (for example, a 3Com Palm Pilot or a Nokia Communicator), would also come within the scope of the invention. After the user reviews the draft of the virtual record, the user will take any number of actions to improve the draft. For example, the user may add additional material, or may subtract any material that is not desired, or may set new criteria for the search and selection of additional extrinsic material. In some cases, the draft of the virtual record will include options of external material, and the user will select among the various options. This process of review, selection and improvement, will continue until the user is satisfied with the final virtual record. Once this record is completed, the user may send the record to other remote terminals, just as any electronic file may be sent to remote terminals.

The invention provides a number of advantages over the prior art. In comparison with the current approach of adding digital memory to remote cameras, the invention allows the use of cameras without such memory; thus, the cameras will be less expensive, smaller, and lighter. Further, the invention provides a group of activities subsequent to recordation, such as central storage, interleaving, and editing to central storage, which cannot be executed by this current approach. Further, there is nothing in the prior art for the interleaving of the user record with extrinsic material. Databases of extrinsic material exist, which the user may locate and search, but this process is tedious and time-consuming. The invention eliminates the need to locate and search relevant databases for extrinsic material.

Still further objects and advantages of the invention will become apparent from a consideration of the ensuing description and drawings.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference tot the following detailed description of an illustrative embodiment when read in conjunction with the accompanying drawings, wherein:

FIG. 3 is a flow chart illustrating the process for user specification of criteria by which extrinsic material in external databases will be searched and selected for inclusion in the virtual record.

DETAILED DESCRIPTION OF THE PREFERRED EMBODIMENTS

The following description of the preferred embodiments discloses specific configurations, components, and process operations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and operations of the present invention that would have been known to one skilled in the art are omitted for the sake of brevity.

Figure 1:
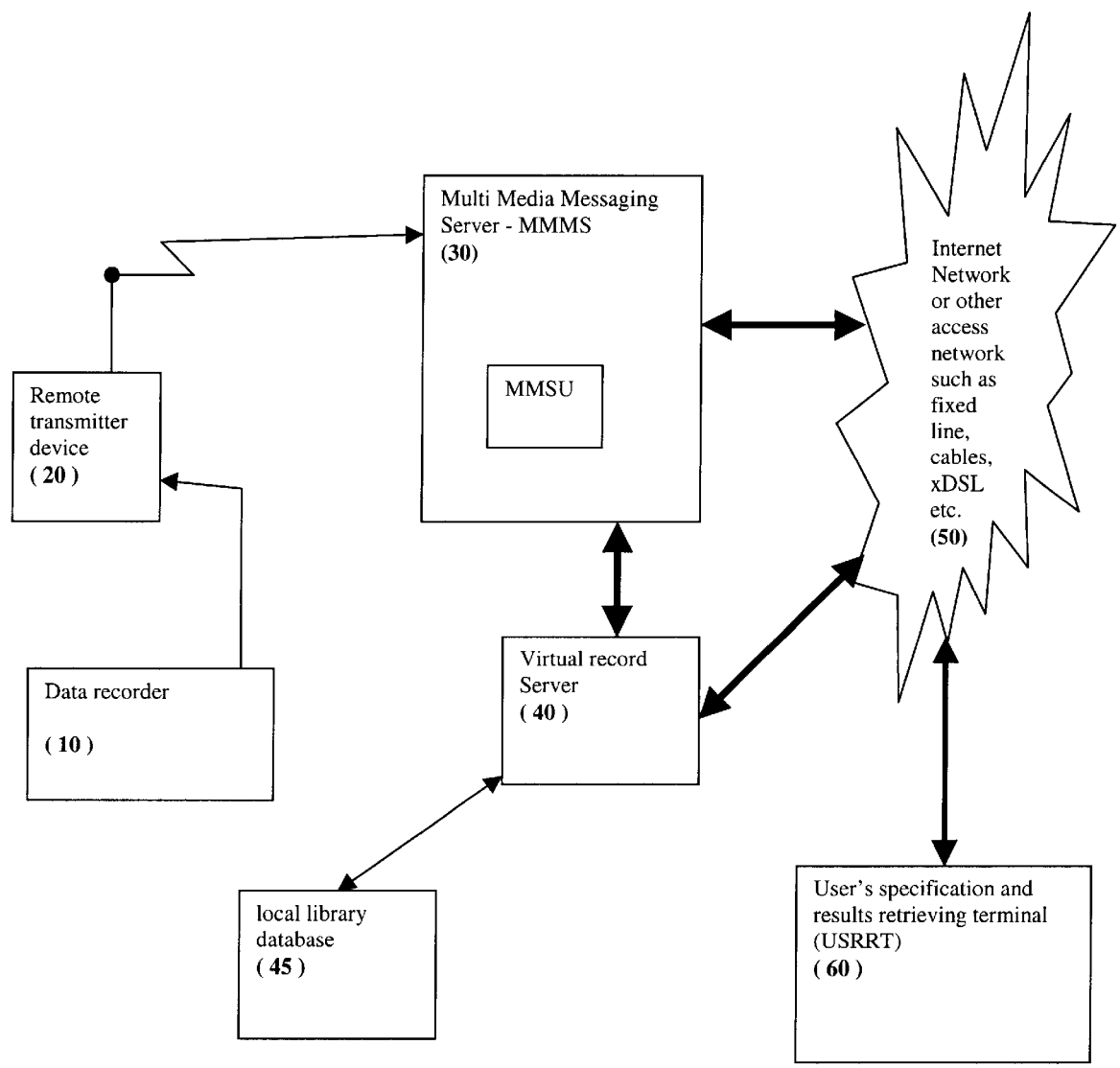
FIG. 1 is block diagram demonstrating the structure of the invention and the lines of communication between the various physical or logical elements of the invention.

With reference to FIG. 1, the multi-media generation and storage system in accordance with a preferred embodiment of the present invention comprises a data recorder 10, a remote transmitter device 20, a multi-media messaging server 30 (MMMS), a virtual record server 40, a local library server 45, a communications network 50 and a user's specification and results retrieving terminal (USSRT) 60.

The data recorder 10 is operated by a user to generate audio-visual material (hereinafter "the user record") such as still pictures, video recordings, and/or audio recordings of an event. The data recorder 10 may be, for example, a digital camera, a digital camcorder, an audio recorder or any type of audio or video recording device which generates analog or digital audio-visual material. The digital data of the user record is provided to a remote transmitter 20 which formats the digital data of the user record for transmission and then transmits the formatted digital data to the MMMS 30. In the preferred embodiment of the present invention, the user record is provided to the remote as it is generate by the data recorder 10. As a result, a memory unit for storing the user record as it is generated is not necessary. The remote transmitter device 20 may be, for example, a cellular mobile handset or any device with an RF transmitter and antenna. Further, if the user record data is generated in an analog format, then the remote transmitter device 20 must function as a radio modem by initially converting the analog user record data to digital data and then transmitting the digital data. It should be noted that the data recorder 10 and the remote transmitter 20 may be separate devices connected via a wireline or wireless communications link, or the remote transmitter device 20 may be incorporated within the data recorder 10 as single unit (e.g., a cellular handset camera). In addition, in the case where the user record comprises images recorded on a fix recording medium (i.e., pictures), a facsimile device may be utilized as the remote transmitter device 20.

In order to transmit the user record in real-time (i.e., streaming) as it is generated by the data recorder 10, the remote transmitter device 20 utilizes the standards of new generation of cellular architecture, known as third generation (3G) cellular, which will permit data speeds of up to at least 2 Mbps from wireless devices, or other standards, such as the in-building standards of Bluetooth and IEEE802.11 for high speed, short distance, wireless communication, based on a type of spread spectrum radio technology, which will permit wireless transmission at speeds of 10 Mbps and greater. The present invention will operate with all of the above standards, including, for example, all versions of the three G (3G) standard, such as Wideband CDMA and CDMA 2000, wherein 3G is the third generation of cellular architecture for high speed digital cellular systems currently under consideration. There are various embodiments of the 3G standard, in particular UMTS which is the European 3G based on either W-CDMA or Digital TDMA, or CDMA2000, which is commonly known as the U.S. 3G. The standards, and the cellular system on which the standards are based, constitute the platform the implementation and operation of the invention.

The MMMS 30 receives the user record transmitted by the remote transmitter device and stores the user record in a multi-media storage unit (MMSU) which is a central storage unit for the various types of digital material generated by the data recorder 10 and transmitted to the MMMS 30 from the remote transmitter device 20. The MMSU may be located at the MMMS 30 or may be a separate storage unit which is communicably linked to the MMMS 30. Further, the MMMS 30 transmits the user record to different requesters of the user record, such as the remote transmitter device 20, a virtual record server 40, or a communication network 50. In addition, the MMMS 30 may automatically transmit to the remote transmitter device 20 a confirmation message indicating whether the transmission of the user record was properly received at the MMMS 30 from the remote transmitter device 20. Accordingly, if a confirmation message is not received or if the confirmation message indicates an error in the reception of the user record, the user can take corrective action, such as fixing the transmitter or re-recording the user record. Similarly, the remote transmitter device 20 may initiate the transmission of a confirmation from the MMSU 30 by transmitting a request to the MMMS 30 regarding the status of the user record.

The virtual record server 40 enriches the user record by adding and interleaving extrinsic material to the user record. In particular, the virtual record server 40 receives user selected criteria and specifications for the addition of extrinsic material and then retrieves and stores extrinsic material in accordance with the selected criteria and specifications. The user selected criteria and specifications are specified by a user via the USSRT which is a processing terminal such as a computer or a personal data assistant. In the preferred embodiment of the present invention, a user operates the USSRT to access the virtual record server 40 via an internet web site which provides a content enrichment interface for the user selection of different types of extrinsic audio-visual material for addition to the user record as shown in FIG. 3. That is, the user selected criteria and specifications are provided to the virtual record server 40 from the USSRT 60 via the communication network 50 which may be, for example, the Internet, a fixed line, a cable network, or any version of an xDSL line.

Based on the user selected criteria and specifications, the virtual record server 40 searches various external databases (not shown), including the local library database 45, for relevant extrinsic material. The external databases are already established and well known in the art, and include, for example, commercial databases of photographs and/or music. It is very likely that in the future, there will be developed additional databases, such as databases of short videos, which will be accessible via the communication network 50. Further, the virtual record server 40 may maintain the local library database 45 which stores a local library of content including extrinsic material previously retrieved from other external databases in accordance with prior user selected specifications and criteria.

After searching the external databases and the local library database, the virtual record server 40 transmits extrinsic material identified as possibly relevant, to the USRRT 60 via the communication network 50. The USRRT 60 sorts and selects the received extrinsic material identified as possibly relevant, and transmits the selected extrinsic material to the virtual record server 40 for interleaving with the user record and final processing.

After the virtual record is generated by adding and interleaving the extrinsic material to the user record, the virtual record server 40 transmits the virtual record to the to the MMMS 30, which stores the virtual record in the MMSU, and the USSRT 60 for review and editing. Further, a user can retrieve the user record or the current draft of the virtual record at any time from the MMSU, e.g., for purposes of editing, forwarding to others, or simply enjoyment, by sending a request from the USSRT to the virtual record server 40.

Figure 2A:
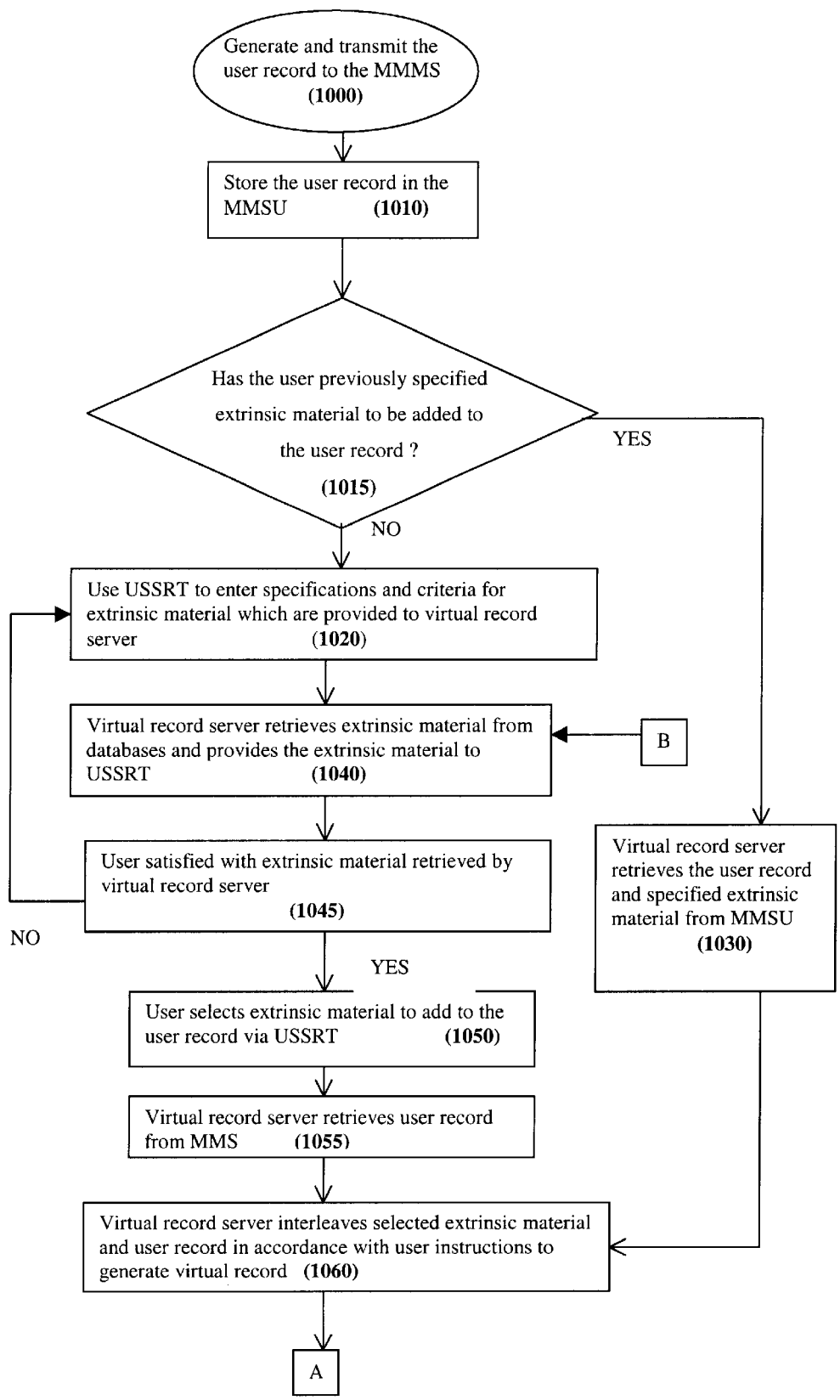
FIGS. 2A and 2B are flow charts demonstrating the process flow of the various decisions and actions of both the user and the network.
Figure 2B:
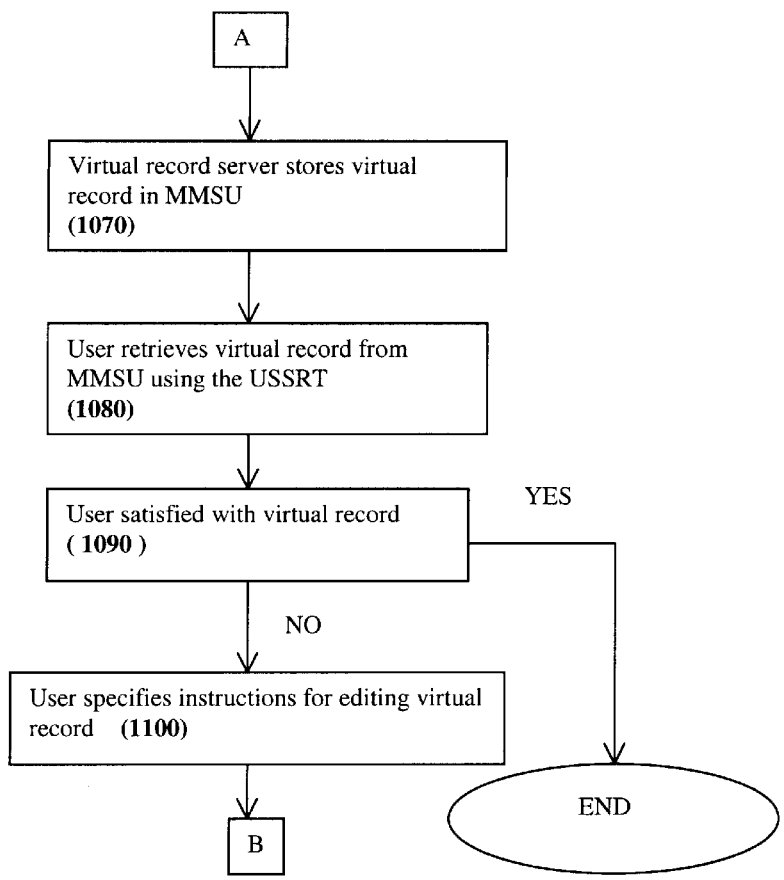

With reference to FIGS. 2A and 2B, the method of generating and storing the virtual record will be described in accordance with a preferred embodiment of the present invention. Beginning with operation 1000, a user operates the data recorder 10 to generate the user record which is transmitted in real-time to the MMMS 30 by the remote transmitter device 20. The MMMS 30 then stores the user record in the MMSU (operation 1010). Next, it is determined whether the user has previously specified extrinsic material which is stored in the MMSU for addition to the user record to create the virtual record (operation 1015). If the user has not previously specified extrinsic material to be added to the user record, the system waits until the user accesses the virtual record server 40 via the USSRT 60 and enters criteria and specifications for the retrieval of extrinsic material to be added to the user record (operation 1020). The virtual record server 40 then retrieves the extrinsic material in accordance with the user specifications and criteria from the local library database and/or other external databases via the communications network 50 (operation 1040). The retrieved extrinsic material is provided to the USSRT 60 and the user determines if the retrieved material is acceptable (operation 1045). If the retrieved extrinsic material is acceptable, the user then uses the USSRT 60 to enter instructions and select the extrinsic material for addition to the virtual record (operation 1050), otherwise the process returns to operation 1020 where the user enters in new specifications and criteria for the extrinsic material. If the user has previously selected extrinsic material to add to the user record, the virtual record server retrieves the selected extrinsic material from the MMSU via the MMS 30 (operation 1030). The virtual record server 40 then retrieves the user record from the MMSU via the MMMS 30 (operation 1055) and interleaves the selected extrinsic material and the user record to generate the virtual record (operation 1060). The virtual record server 40 stores the virtual record in the MMSU (operation 1070). Using the USSRT 60, the user retrieves the virtual record which is stored at the MMSU (operation 1080) and determines whether the virtual record is acceptable (operation 1090). If the user wants to further edit the virtual record, the user specifies instructions for editing the virtual record (operation 1100), and the instructions are provided to the virtual record server 40 which repeats the process starting at operation 1040, except that now the material considered to be the user record is the virtual record.

With reference to the flowchart of FIG. 3, the content enrichment interface (CEI) is will be described. The CEI is interface between the information (i.e., the extrinsic material) needs of the user and the organization of external databases The function of the CEI is therefore two-fold, first, to help the user to organize their thoughts (i.e., to help the user determine what is really required or desirable), and second, to organize the request for extrinsic material in such a way that the request can be executed by the system against a variety of external databases. The CEI is provided to the user when the user accesses the virtual record server 40 via the USSRT 60. In other words, when a user operating the USSRT 60 accesses the virtual record server to create or edit the virtual album, the USSRT 60 downloads the CEI in order to assist the user in selecting extrinsic material to be added to the user record. The fulfillment of the first function is evident in the nature of the questions posed.

Beginning with operation 2000, the user is requested to enter a title of the search (i.e., key words) which indicates the general type of information that the user wants to retrieve. The title information is organized according to a key word search, possibly but not necessarily by Boolean criteria.

Next, in operation 2010, the user is asked to specify the tone and nature of the extrinsic material to be obtained which is defined as the subject content, e.g., entertainment, travel, business, personalities and politics. There is a major difference, for example, between information stored as "entertainment" and information stored as "business". The user should specify the desired extrinsic material, by subject content which will help filter the request so that the extrinsic material is both relevant and meaningful.

The user is requested in operation 2020 to provide the one or more sources of the extrinsic material such as the Internet, a local intranet, or other sources. For example, the user may specify a general Internet search, and such a search may be conducted with standard search engines such as Yahoo, or Copernic 2000. Alternatively, the user may specify a local intranet, or some other information source. Further, multiple information sources may be specified.

Lastly, the user is requested in operation 2030 to specify the type and format of content desired, e.g., still image, text, video (MPEG 2, MPEG4, MPEG1, QuickTime, or other formats), and/or audio (WAV, MIDI, MP3, or other formats).

The user entered specifications illustrated in the flow chart of FIG. 3 allow the system to search the appropriate kinds of external bases for possibly relevant extrinsic material. At this stage, the extrinsic material is only possibly relevant, since the final decision as to relevance will be made by the user. For example, the user may take a trip to London, but for some reason may fail to visit the Tower of London. Therefore, the user may request, and provide specifications for, extrinsic material regarding the Tower of London. This extrinsic material could be an image, such as various still photographs, or text, such as descriptions, or video, such as a view from the air, or audio, such as a recounting of the history of the Tower of London. However, it is likely that the search request will either return no extrinsic material or multiple options of extrinsic material. In either case, the user will need to decide what should be done. For example, if no extrinsic material is returned, the user may decide either to stay with the present material or to alter the request in order to change the search. On the other hand, for example, if multiple options are obtained, the user must select among the various options and select the extrinsic material to the virtual record, or enter new criteria for selecting among the options. The process defined in FIGS. 2A and 2B, using the structure defined in FIG. 1 and the process of the CEI illustrated in FIG. 3, is iterative until the user is satisfied with the final product, that is, the virtual record that is desired by the user.

The present invention provides a number of advantages over the prior art. In particular, the present invention reduces the burden in memory and processing power of the remote unit. This will allow the creation of smaller, lighter, and cheaper, remote units since the burden of the system is placed on the network and not on the consumer. For example, conventional digital camera must include a digital memory whereas the present invention allows the use of cameras without such memory thereby making the cameras less expensive, smaller, and lighter.

Further, as described above, the present invention provides a group of activities subsequent to recordation, such as central storage, interleaving, and editing to central storage, which cannot be executed by this conventional systems or methods. Further, there is nothing in the prior art for the interleaving of the user record with extrinsic material. Databases of extrinsic material exist, which the user may locate and search, but this process is tedious and time-consuming. However, the present invention eliminates the need to locate and search relevant databases for extrinsic material.

The present invention also utilizes the speeds increasingly being offered by cellular systems, first by so-called 2.5G systems, and very soon by the 3G systems that will permit data transfer in the range of several megabits per second. Higher speeds will also be possible from Bluetooth and EE802.11, and other short-range, high-speed networks. The present invention provides value to these types of systems, which is a major benefit to those who invest in and operate such systems.

In addition, the present invention makes maximum use of activities which now can be and should be centralized, including central storage and central processing, the latter made up of receiving extrinsic information, sorting such information, interleaving such information with the user record, and allowing user editing. These activities are not conducted today for the purpose of creating virtual records, but the invention will make possible such activities. This will allow consumers to create new kinds of records not presently available, including for example, trip reports with music and pictures, business reports and records with extrinsic market forecasts, reports on political figures with video selected from a variety of extrinsic material, and other such new kinds of combinations helps maximize the value of data storage systems, particularly those offered by, for example, telephone companies in the provisioning of voice mailboxes.

The present invention may be applied to voice mailboxes to expand the use of these mailboxes to activities other than voice messaging.

Upon reference to all of the foregoing, those skilled in the art will appreciate that in the applicant in the present application has provided a novel, useful, and unobvious system and method for automatic interleaving of extrinsic material from databases and customized audiovisual material prepared by a user (i.e., the user record), thereby allowing the creation and sharing or virtual records, and thus creating a myriad of benefits to both consumers and operators of communication systems.

Although the description contains many specificities and examples, these should not be considered to exhaust the embodiments of the invention. Rather, the scope of the invention should be defined and determined by the widest scope provided in the appended claims and their legal equivalents.

I claim:

1. An apparatus for the storage and modification of multi-media data, comprising:
   a data recording unit configured to generate media data, wherein the media data comprises at least one of audio data or image data of a recorded event;
   a transmitter unit communicably linked to said recording unit and configured to receive said media data from said data recording unit and transmit said media data via a digital mobile network in real time as it is generated by said data recording unit; and
   a first server unit configured to receive and store said media data transmitted from the transmitter.

2. The apparatus of claim 1, further comprising a second server unit communicably linked to said first server unit and configured to retrieve said recorded media data from said first server and combine said media data with extrinsic data to generate a virtual record of said recorded event.

3. The apparatus of claim 2, wherein said second server unit is configured to transmit said virtual record to said first server and said first server stores said virtual record.

4. The apparatus of claim 3, wherein said second server unit is configured said extrinsic data from at least one database in accordance with user specifications.

5. The apparatus of claim 4, further comprising a terminal configured to input said user specifications for retrieving said extrinsic data from said external database.

6. The he apparatus of claim 4, wherein said second server unit includes a local database configured to store previously retrieved extrinsic material.

7. The apparatus of claim 5, wherein said terminal is configured to transmit to said second server unit user instructions for combining said media data with said extrinsic data to generate said virtual record of said recorded event.

8. A method for generating a virtual record of multimedia data, the method comprising:
   (a) transmitting from a remote unit via a digital mobile network user generated multimedia data in real time as it is generated, the user generated multimedia data comprising at least one of audio data and video data of a recorded event;
   (b) receiving and storing said user generated multimedia data at a central unit;
   (c) inputting specifications for obtaining extrinsic data;
   (d) retrieving the extrinsic data from at least one database;
   (e) combining said extrinsic data and said user generated multimedia data stored at the central unit to create interleaved multimedia data;
   (f) storing said interleaved multimedia data at said central unit.

9. The method according to claim 8, wherein said operation (d) comprises:
   (d1) retrieving preliminary extrinsic data from said database; and
   (d2) selecting the extrinsic data for addition to said user generated multimedia data from said preliminary extrinsic data.

10. The method of claim 9, wherein said operation (d) further comprises:
   (d3) entering user instructions for combining said extrinsic data with said user generated multimedia data.

11. The method of claim 9, wherein the operation (d1) further comprises transmitting the preliminary extrinsic data to a remote terminal.

12. The method of claim 8, further comprising:
   (g) transmitting said interleaved multimedia data to a remote terminal.

13. The method of claim 12, further comprising:
   (h) providing instructions for editing said interleaved multimedia data; and
   (i) editing said interleaved multimedia data by repeating operations (c) through (f).

14. A system for generating a virtual record from a user record comprising at least one of audio data and video data of an event, the system comprising:
   a data recorder configured to generate the user record;
   a remote transmitter device configured to receive the user record from the data recorder and transmit via a wireless communications link the user record in real-time as it is generated by the data recorder;
   a central server configured to receive and store the user record transmitted from the remote transmitter;
   a virtual record server configured to retrieve the user record from the central server, combine the user record and the extrinsic material to generate the virtual record and transmit the virtual record to the central server for storage.

15. The system of claim 14, further comprising a user terminal configured to input user specifications regarding the extrinsic material, wherein the virtual record server is configured to retrieve the extrinsic material from at least one external database in accordance with the user specifications.

16. The system of claim 15, wherein the virtual server is configured to transmit the virtual record to the user terminal and the user terminal is configured to transmit additional user specifications to the virtual server for editing the virtual record.

17. The system of claim 15, further comprising a communications network communicably linking the central server, the virtual record server and user terminal.

18. The system of claim 15, wherein the central server comprises a multimedia messaging server.

19. The system of claim 15, wherein the virtual record server comprises a storage unit configured to store previously retrieved extrinsic data.

20. The system of claim 14, wherein the central server comprises a storage unit configured to store the user record and the virtual record.

21. The of claim 18, wherein the remoter transmitter device is configured to transmit the user record to the multimedia messaging server in real-time as the user record is generated by the data recorder.

* * * * *